Dec. 27, 1932.  C. B. JOHNSON  1,892,276
CLOTHESLINE REEL
Filed April 14, 1930

Inventor
Cornelius B. Johnson
by Bair, Freeman & Sinclair
Attorneys

Witness
H. S. Munzenmaier

Patented Dec. 27, 1932

1,892,276

UNITED STATES PATENT OFFICE

CORNELIUS B. JOHNSON, OF DES MOINES, IOWA, ASSIGNOR TO THE FIRST INVESTMENT CORPORATION

CLOTHESLINE REEL

Application filed April 14, 1930. Serial No. 444,192.

The object of my invention is to provide a clothes line reel of simple, durable and inexpensive construction.

The reel of the present application is an improvement upon the reel disclosed in my Patent No. 1,027,655, issued May 28, 1912.

A further and more particular object of the present reel is to provide a simple structure, such that the reel can be conveniently and easily re-threaded.

Still another purpose is to provide a novel and improved reel casing structure.

Another purpose is to provide an improvement in the ratchet spring control.

It is a further purpose of my invention to make certain improvements in the other details of construction, and with these and other objects in view, by invention consists in the construction, arrangement and combination of the various parts of my clothes line reel, whereby the objects contemplated are attained, as hereinafter more fully set forth, pointed out in my claims, and illustrated in the accompanying drawing, in which:

Figure 1:
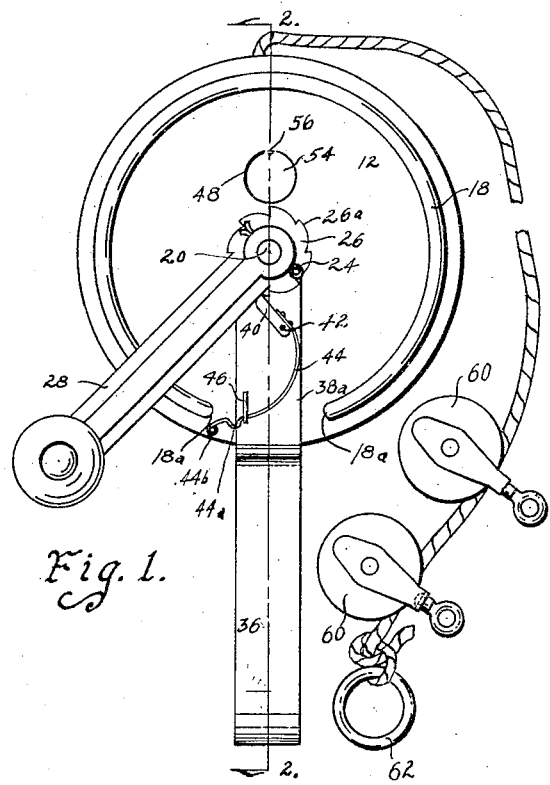
Figure 1 shows a side elevation of a clothes line reel embodying my invention.

In the accompanying drawing, I have used the reference numeral 10 to indicate generally a hollow sheet metal cylinder which forms the body of the casing for my improved reel. The ends of the casing cylinder 10 are formed of round disc-like members 12 and 14, with annular in-turned peripheral flanges 16 for receiving the edges of the cylinder 10.

Near their outer edges, the end walls 12 and 14 are provided with arcuate ribs 18. The ends of the ribs 18 form stops as indicated at 18a for limiting the swinging pivotal movement of the handle hereinafter referred to with relation to the casing formed by the members 10, 12 and 14.

Figure 2:
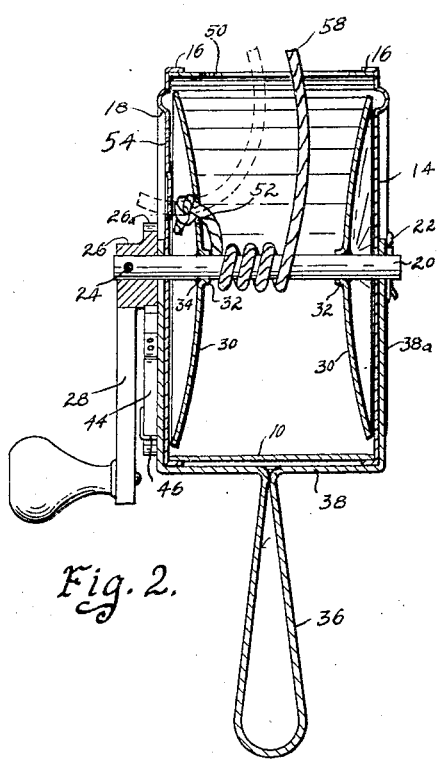
Figure 2 is a detail, sectional view taken on the line 2—2 of Figure 1.
Figure 4:
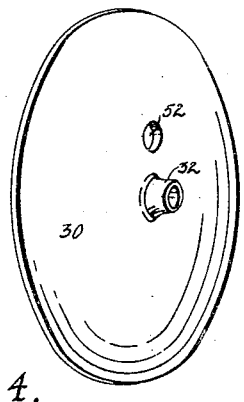
Figure 4 is a perspective view of one of the disc-like spool members.

I provide a shaft 20 rotatably mounted in the members 12 and 14 as shown in Figure 2. Extended through one end of the shaft 20 is a suitable cotter pin 22.

Detachably mounted on the other end of the shaft 20 by means of a cotter pin 24 is the hub 26 of a crank handle 28.

Figure 3:
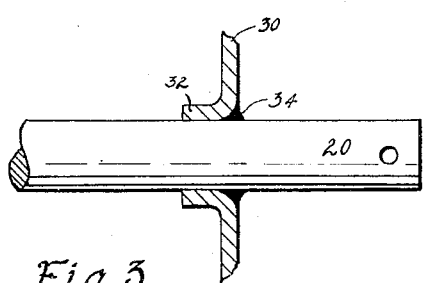
Figure 3 is an enlarged, detail, sectional view of a portion of the shaft and spool member taken on the same line as Figure 2.

Fixed on the shaft 20, spaced from each other within the casing, are concavo-convex disc-like spool members 30. As shown in Figure 3, each of the spool members 30 has a central, tubular hub 32, which receives the shaft 20 and is brazed thereto or may be soldered as indicated at 34.

I provide a handle 36, having a yoke-shaped portion 38 with the arms 38a, through which the shaft 20 extends. The arms 38a receive between them the casing, and are allowed some pivotal movement with relation to the casing between the ends 18a (see Figure 1).

The hub 26 has formed thereon ratchet teeth 26a. For coacting with the ratchet teeth 26a, I provide a pawl 40 pivotally mounted as at 42 on the arm 38a on that side of the casing where the ratchet is located. A curved spring 44 is secured to the pawl 40 and is extended through a staple 46 fastened to the adjacent arm 38a. Near its outer end the spring 44 has spaced projecting portions 44a and 44b. When the spring is in the position shown in Figure 1, it holds the pawl in engagement with the ratchet. By shoving the projection 44a through the staple 46, so that the staple is between the projections 44a and 44b, the spring can be caused to hold the pawl out of engagement with the ratchet.

The manner of assembling the parts will be obvious from the foregoing description.

I will now describe the means provided for threading the rope or clothes line.

The end member 12 has on the opposite side of the shaft 20 from the handle 36 a hole 48 large enough so that two fingers may be thrust therethrough or large enough to receive a suitable tool or instrument.

The member 10 has a longitudinally elongated hole 50, substantially opposite the handle 36.

It will be noted that the handle 36 has only limited rotary motion with relation to the casing, and when the handle 36 is in its normal midway position, as shown in Figure 1, then it and the hole 48 and the hole 50 are in substantial alignment.

It will be understood of course that the handle 28 and the shaft 20 and the members 30 must be moved to a certain position for securing this alignment.

The left-hand spool member 30 shown in Figure 2 has a hole substantially in alignment with the hole 48 as indicated at 52 in Figure 2.

Ordinarily the device is threaded in the factory, and the hole 48 is not completely formed, but the material is cut away to form a disc 56 attached by a small portion of metal 56 to the main body of the end 12. I call the portion 54 a cut-out.

This cut-out is left in the reel until the occasion arises for re-threading. By thus leaving it in, it tends to help keep dust out of the reel. Whenever the time comes that the reel must be rethreaded for any reason, the user knocks out the cut-out 54 or pries it out, if it has not already been taken out. He can then take one end of the clothes line 58 and from the outside insert it through the hole 50 and through the hole 52. He then reaches in with his fingers or a tool through the hole 48, grasps the end of the clothes line, and pulls that end outwardly through the hole 48, ties a knot in the end of the clothes line, and reinserts it through the hole 48. It will be noted that the hole 52 is substantially smaller than the hole 48, so that the knot will not go through the hole 52. Then the user can grasp the handle 36, and with the other hand grasp the handle 28, and rotate the handle 28 clock-wise (see Figure 1) for winding the clothes line on the spool formed by the shaft 20 and the members 30.

The ribs 18 serve to strengthen the members 12 and 14, and they also serve as stops to limit the rotation of the casing with relation to the handle 36. This arrangement by which the casing is allowed a limited rotary movement with relation to the handle serves two purposes.

In the first place, it is important that the casing should not be permitted to rotate entirely around because it might then turn with the reel and interfere with winding up the rope and permit tangles in the casing.

In the second place, this arrangement of the stops to permit limited rotary motion of the casing with relation to the handle serves a very important function. When the line is stretched taut for use, the casing will automatically adjust itself to position where the hole through which the line emerges is in line with the point where the line leaves the roll on the reel. The amount of rotation allowed by the stop is sufficient to permit of this alignment regardless of the size of the roll. The casing adjusts itself automatically depending on the diameter of the roll. In actual practice when the line is taut, it will scarcely touch the edges of the hole in the casing. If it were not for the arrangement now under consideration, the line would swing against the metal around the hole, because the rope would pass over such edge and form an angle there. When the wind blows, this would be quite serious and would tend to cause the rope to be sawed in two.

I preferably mount loosely on the clothes line 58 on the outside of the casing for sliding movement on the clothes line a pair of swivel pulleys 60.

The end of the clothes line is provided with a ring or the like 62. The pulleys which are strung loosely on the line outside of the casing provide a very convenient method for supporting the line at intermediate points between its ends. Since they are freely movable on the line, they may be used at any desired location for attaching to hooks carried by poles or other supports. Furthermore, the line in the operation of tightening, will run freely through the supported pulleys, thereby eliminating friction and wear on the line and rendering the stretching operation a very easy task.

The particular arrangement of the spring 44 with its members 44a and 44b in combination with the staple 46 makes the spring easy to operate for controlling the pawl. The use of the staple prevents the user from pulling the spring outwardly away from the casing and breaking it.

The three-part casing, as shown herein, greatly facilitates the assembling of the parts in a quick and convenient manner.

The construction already explained for providing for a convenient threading is an important improvement in the present device.

It should be explained perhaps that the members 30 are of such shape and material as to have ample strength to prevent their being bent under the strain of use to which they are put. The handle is fastened directly to the shaft, so that substantially no strain is imposed upon the casing itself.

Some changes may be made in the details of the construction and arrangement of the parts of my improved clothes line reel without departing from the real spirit and purpose of my invention, and it is my intention to cover by my claims, any modified forms of structure or use of mechanical equivalents, which may be reasonably included within their scope.

I claim as my invention:

1. A clothes line reel, comprising a hollow cylindrical casing, a shaft extended through the end walls thereof, a handle on said shaft outside the casing, concavo-convex spool members fixed on said shaft within the casing with their concave faces outward, a handle having a yoke portion with its arms pivoted on said shaft outside the casing, stops on the outside of the casing to limit the rotary movement of the casing with relation to the handle, one side of said casing and one of said spool members having threading holes, which may be aligned in a certain position of the rotary movement of the shaft, said casing having in its outer wall a hole through which a clothes line may be inserted arranged on the same side of the shaft as said first described hole, whereby a clothes line may be threaded on the reel in the manner described.

2. A clothes line reel, comprising a hollow cylindrical casing, a shaft extended through the end walls thereof, a handle on said shaft outside the casing, concavo-convex spool members fixed on said shaft within the casing with their concavo faces outward, a handle having a yoke portion with its arms pivoted on said shaft outside the casing, stops on the outside of the casing to limit the rotary movement of the casing with relation to the handle, one side of said casing and one of said spool members having threading holes, which may be aligned in one position of the shaft, said casing having in its outer wall a hole through which a clothes line may be inserted arranged on the same side of the shaft as said first described hole, whereby a clothes line may be threaded on the reel in the manner described, said stops having the form of reinforcing ribs.

3. In a reel of the class described, a casing comprising a cylinder and end caps therefor, said end caps being provided with outwardly projecting ribs, the ends of which form stop members, a shaft journaled in the casing and caps concavo-convex rigid spool discs fixed on said shaft within the casing, a crank handle having a hub fixed on said shaft outside the casing, said hub being provided with a ratchet, a spring actuated pawl for coacting with said ratchet, said casing having a hole in its outer wall for the clothes line, said reel having means for convenience in rethreading it, comprising a hole in one end wall of the casing and in one of said spool discs adapted to be aligned with each other and located on the same side of the shaft as said first hole, when the shaft is in one position of its rotation, a handle having arms in which said shaft is journaled, and means for limiting the rotary movement of the casing on the handle.

4. A clothes line reel comprising a hollow cylindrical casing, a shaft rotatably extended through the end walls thereof, a handle on said shaft outside the casing, spool members fixed on the shaft within the casing, a second handle having a yoke portion with its arms pivoted on said shaft outside the casing, one side of the casing and one of the spool members having threading holes which may be aligned in a certain position of the rotary movement of the shaft with relation to the casing, the casing having in its outer wall a hole through which a clothes line may be inserted for then inserting it further through the aligned holes in the spool and casing, so that the end of the clothes line may then be knotted and allowed to slip back through the first-named hole in the case for thus threading the reel.

CORNELIUS B. JOHNSON.